March 12, 1940.  F. H. A. BRANDT  2,192,892

GLASS-TO-METAL SEAL

Filed April 6, 1937

INVENTOR
FRIEDRICH H. A. BRANDT
BY
ATTORNEY

Patented Mar. 12, 1940

2,192,892

UNITED STATES PATENT OFFICE 2,192,892

GLASS-TO-METAL SEAL

Friedrich H. A. Brandt, New York, N. Y.

Application April 6, 1937, Serial No. 135,214

4 Claims. (Cl. 250—27.5)

This invention relates to seals in glass electrical apparatus adapted to operate at high temperatures, and more particularly to the seals by which metallic conductors are led through the glass walls of such apparatus.

There have recently come into use a number of devices in which a perfect hermetic seal is required between the interior and the exterior of the apparatus and in which lead-in conductors are required to withstand high temperatures, e. g., of the order of 200 to 300° C. or higher. One of the factors which tends to limit the useful life of such apparatus has been the deterioration of the seal between such lead-in conductors and the glass wall of the apparatus. The design of such seals, insofar as the adhesion of glass to the metal and insofar as the matching of coefficients of expansion between glass and metal are concerned, and the use of graded seals to change gradually from a glass which adheres well to the metal and a glass which has a coefficient of expansion particularly near to that of the metal, to avoid cracking, and finally to a glass which is suitable for the body of the apparatus, are matters which are well understood; but, in spite of this, great difficulty has been experienced in designing seals which could withstand operating conditions, especially where the lead-in conductors of such seals are subjected to temperatures above 200° C. with the exterior of the seal exposed to atmospheric air. Intensive efforts have been made to develop new glasses more suitable for such seals and which would withstand the severe temperature conditions, but without complete success. Especially with recent commercial development of metal vapor lamps this problem has become increasingly important, since the great advantage in efficiency of such lamps is partly offset by their higher initial cost unless long life is assured.

I have now discovered that seals which in spite of proper design so far as thermal expansion and adhesion are concerned have deteriorated rapidly and failed within several hundred hours of operation at high temperatures with the seals exposed to atmospheric air may be made satisfactory by addition to the seal of means which excludes the atmospheric air from any very hot juncture between the glass and the adhering metal, e. g., the lead-in conductor, especially if the conductor is of tungsten or molybdenum.

Accordingly, it is one object of my invention to provide an improved glass-to-metal seal for high temperature apparatus.

Another object of the invention is to simplify the problem of designing satisfactory seals for high temperature apparatus.

Another object of the invention is to lengthen the useful life of glass-metal seals in high temperature apparatus.

I am able by this invention to make high temperature devices, as for example the high pressure mercury vapor lamps in which the lead-in conductor within the seal is at a temperature during operation in the neighborhood of 200° to 300° C. or higher, which will burn reliably for several thousand hours with the seals exposed in an atmosphere of air.

In the accompanying drawing and in the following specification I have shown and described several preferred embodiments of my invention and have suggested certain modifications thereof. These I have chosen with a view to illustrating and explaining the invention, and it should be understood that these are not intended to be either exhaustive or limiting of the invention, but on the contrary it is my intention to so instruct others skilled in the art that the invention may be used in numerous forms and may be varied and modified to meet the particular requirements and conditions of any use.

Figure 1:
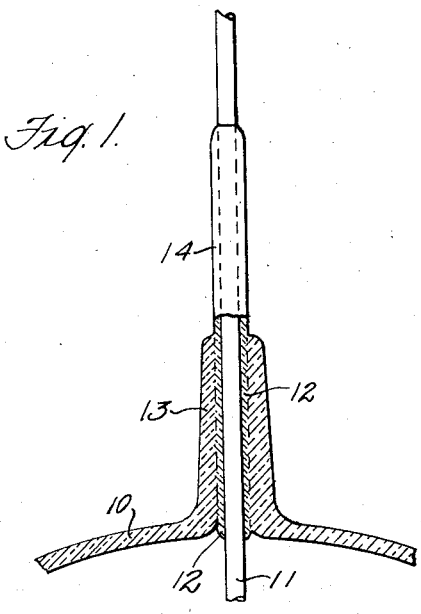
Fig. 1 is a view in longitudinal cross-section of the seal between the envelope and the electrode lead wire of a high temperature metal vapor lamp, embodying my invention, and showing adjacent portions of the envelope and the electrode wire both broken away.

Referring first to Fig. 1, the glass envelope, e. g., of a typical high pressure mercury vapor lamp is indicated at 10. The lead-in wire 11 is sealed through the glass wall of the envelope 10 to conduct the arc current to the electrode and this wire is ordinarily of tungsten. According to common practice, the wire 11 is first covered with a very thin layer of a beading glass 12 which for example may be the boro-silicate glass manufactured by the Corning Glass Works and commonly known to the trade as "705". Over this is fused a bead 13 of a softer glass, for example a uranium glass such as that manufactured by Corning Glass Works and commonly known to the trade as "332" and this in turn is fused to the hard glass used for the body of the envelope 10. The latter may for example be Pyrex ("702P") or the hard boro-silicate glass known as "175AJ". All of the glasses mentioned above are well known to the trade and are commercially available under these designations, and are described for example in the trade circular of the manufacturer, Corning Glass Works, by W. L. Wetmore, dated January 10, 1936. It should be understood, moreover, that these glasses are given as illustrations and that the invention is not dependent upon any particular composition used in these glasses, but is applicable generally to any properly designed seal between the metal and glass; and the particular glasses of such seals may be chosen on considerations well understood in the art.

As thus far described, this is a typical graduated seal as manufactured prior to my present invention. In the present case, however, instead of making the coating 12 of beading glass on the wire 11 substantially co-extensive in length with the bead of intermediate glass 13, the inner coating 12 is extended beyond the bead 13 for a substantial distance, e. g., a length equal to that of the bead 13. In the preferred example this extended coating is 1/8" to 1/4" long and .001" to .015" in thickness.

A seal constructed in this way, when used for example in a standard high pressure mercury vapor lamp with the seal exposed in the open atmosphere or in a jacket not sealed from the atmosphere, may be burned at its normal loading, or even with a substantial over-loading, without noticeable deterioration for many times the life of a similar seal made without the protective extension 14.

Although I am not at the present time able to state positively the reason for this improvement, I believe that it is due to a reaction at the surface between the metal of the lead-in conductor and the glass and in which the air takes part, either as a re-agent or as a catalyst and that this reaction occurs only at high temperature. By extending a thin protective layer along the wire 11 to a point at which the temperature is sufficiently reduced so that the reaction does not occur, this deterioration is avoided; whereas, if the metal-glass interface is exposed at the end of the relatively thick bead 13, the temperature of the wire is still sufficiently high at that point to cause the deteriorating reaction. Although I believe this to be the most reasonable explanation of the phenomena which I have observed and of the improvement which is secured by my invention, I am aware that this may be due to purely physical causes, for example to the qualities peculiar to a thin coating as distinguished from the thicker bead 13.

Figure 2:
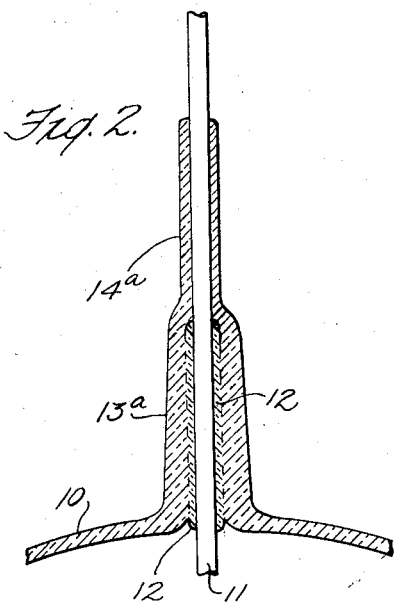
Figs. 2, 3 and 4 are similar views showing modified forms of the invention.

Although, in Fig. 1, I have shown the inner beading glass 12 extended into the protective coating 14, it is not essential that this protective coating should be of the same material as the inner beading glass of the seal. Thus, for example in Fig. 2, I have shown the intermediate glass 13a drawn out to a very thin tube which is fused to the wire 11 thereby forming a thin protective coating 14a similar to the protective coating 14, except that it is of the intermediate glass instead of the inner beading glass 12. Instead of drawing out the end of the bead 13a the protective coating 14a may be formed by a separate thin tube of glass slipped over the wire fused thereto and to the glass of the seal. This tube may be the same as the beading glass 12 or the intermediate glass 13a or it may be a different glass.

Again instead of a tube, the extension 14a may be formed as an enamel, e. g., by painting or spraying a finely divided enamel material onto the wire and the adjacent seal and then heating the seal and wire to a temperature at which the enamel is fused to a continuous coating. In cases where the temperatures reached by the wire 11 are not excessive this coating may be a refractory resinous material, as for example the so-called alkid or glyptal resins made by reaction of a polyhydric alcohol with a polybasic acid and a monobasic acid. As a more specific example may be mentioned ordinary glyceryl phthalate modified by 40-60% of its weight of castor oil fatty acids. This resin may be used where the temperatures are in the neighborhood of 200° C. Again, instead of a coating of insulating material, a metallic coating may be used. Thus, for example, the end of the envelope, and especially the bead around the wire, may be coated with some conductive substance, e. g., a colloidal graphite suspension such as aquadag, preferably extending into contact with the wire 11, and the apparatus then immersed in an electrolytic bath with the wire connected to the plating circuit so that an electrolytic deposit of the metal is plated onto the wire and the end of the tube.

Figure 3:
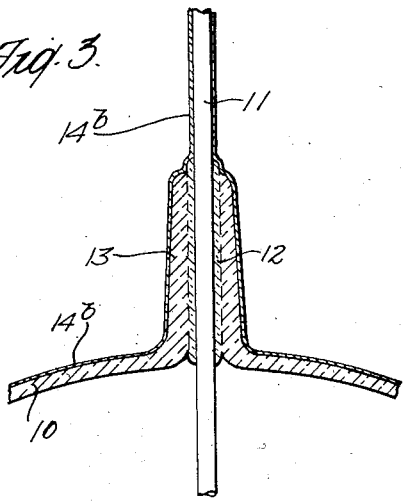

In Fig. 3, I have shown the case in which a coating 14b, whether of enamel, resin or metal or other suitable substance, is extended over the bead 13 and the wire 11 beyond the bead 13 so as to seal the juncture between them.

I have also found that certain metals are more reactive than others with any given glass, and as a consequence the interface between the glass and the lead wire may be protected by a plating of another non-reacting metal on the lead-in wire within and beyond the outer end of the seal, even though such metal in itself would not be satisfactory to form a seal. Or, similarly, a wire of such unreactive metal may be welded to a wire of a metal suitable for forming a seal so that the former extends into the outer end of the seal and the latter extends through the balance of the seal with its perfect adhesion to the glass securing the seal against pressure and vacuum.

Figure 4:
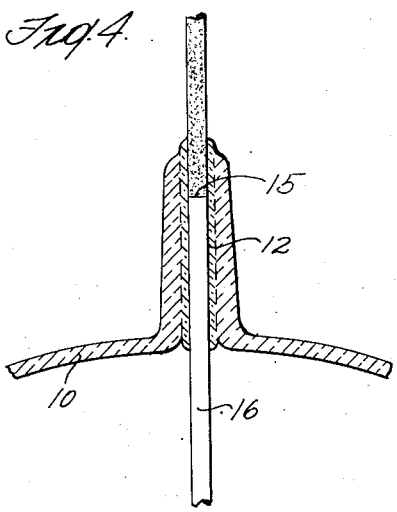

This I have illustrated, for example in Fig. 4, in which the metal at the surface of the lead wire to the point 15 is one which does not react with the glass in the presence of air at high temperature or otherwise deteriorate the glass-metal interface; whereas, the inner portion of the wire 16 is of a metal which gives the perfect adhesion to the glass necessary to maintain complete isolation of the atmosphere within the apparatus. Thus, for example, I have found, with the uranium glass mentioned above or with the glass known as Nonex, nickel does not react at the temperatures to which these leads are ordinarily subjected in the commercial high pressure mercury vapor lamps operating for example at one atmosphere pressure. Thus a nickel wire may be welded to a tungsten wire and the two smoothed at the weld to form a substantially continuous surface, and this wire sealed into the bead at the end of the tube substantially as shown in Fig. 4. Or, instead of a welded composite wire, a wire of tungsten may be nickel plated to the point 15 and the seal formed in substantially the same way. In some cases the nickel may be carried entirely through the seal. Thus, for example with Nonex glass, a good adhesion to nickel may be obtained, but ordinarily the composite seal having the nickel extending only part way into the seal is superior because the tungsten forms a more perfect seal with the glass. Instead of the nickel other metals may, of course, be used, for example the iron-nickel-cobalt alloy known as "Fernico" and noble metals such as tantalum may be used depending upon the particular glass which is chosen for the sealing bead.

It follows also from this difference in reactivity of different metals with a given glass and likewise of different glasses with a given metal that in some cases the protective covering must be carried farther out on the wire, i. e., to a cooler portion, than in other cases. Thus, the glass "175AJ" will give protection with a much shorter extension than the glass "705". Moreover, since the purpose of the extension is to protect the glass-metal interface until a sufficiently low temperature is reached to avoid deteriorating reaction, the length of the extension will, of course, depend upon the operating temperature of the device. Thus a longer extension will be required for a zinc or cadmium vapor lamp than for a mercury vapor lamp, and a longer extension for a mercury vapor lamp operating at several atmospheres vapor pressure than for a similar lamp operating at a pressure below atmospheric.

Although I have shown in each case in the drawing a typical seal as used for example in the high pressure mercury vapor lamps, it is to be understood that my invention is not limited to the particular form of the seal nor to graded seals. Thus, for example, I may use the invention in cases where Pyrex envelopes are sealed directly to tungsten wires and where the seals are made by a stem press as well as in the particular type of seal illustrated in the drawing.

Although the results are most important and striking when my invention is used with devices having their seals exposed to atmospheric air, an improvement is shown by use of this novel structure even in vacuo or in atmospheres of gases such as nitrogen, etc., as are commonly used for surrounding such devices.

What I claim is:

1. An electrical apparatus adapted for high temperature operation while exposed to air which comprises a sealed glass envelope, lead-in wires separately sealed through the envelope, and a protective coating covering the juncture between wire and the glass envelope, sealing said juncture from the external atmosphere and extended along the wire to a distance at which the temperature is sufficiently reduced to avoid deterioration of the interface between the glass envelope and the wire by contact with air.

2. In a gaseous electrical discharge device of the type having a glass envelope exposed to atmospheric air and internal electrodes with lead wires thereto sealed through the glass envelope and which normally operate at a temperature sufficiently high to cause corrosion of the lead wire in the edge of the seal if the juncture of glass to the lead wire should be exposed at such temperature to the atmosphere, the combination therein of a layer of glass sealed to said envelope and enclosing said lead wire and sealing it from the atmosphere to a point on the wire where the temperature during operation remains below that at which corrosion of the surface of the wire in the edge of the seal would occur in atmospheric air.

3. In a gaseous electrical discharge device of the type having a glass envelope exposed to atmospheric air and internal electrodes with lead wires thereto sealed through the glass envelope and which normally operate at a temperature sufficiently high to cause corrosion of the lead wire in the edge of the seal if the juncture of glass to the lead wire should be exposed at such temperature to the atmosphere, the combination therein of a layer of glass sealed to said envelope and enclosing said lead wire and sealing it from the atmosphere to a point on the wire where the temperature during operation remains below about 200° C.

4. In a gaseous electrical discharge device of the type having a glass envelope exposed to atmospheric air and internal electrodes with lead wires thereto sealed through the glass envelope and which normally operate at a temperature sufficiently high to cause corrosion of the lead wire in the edge of the seal if the juncture of glass to the lead wire should be exposed at such temperature to the atmosphere, the combination therein of a layer of glass sealed to said envelope and enclosing said lead wire and sealing it from the atmosphere to a point on the wire where the temperature during operation remains below about 300° C.

FRIEDRICH H. A. BRANDT.